United States Patent
Patel et al.

(10) Patent No.: US 12,247,163 B2
(45) Date of Patent: Mar. 11, 2025

(54) FERRATE(VI)-BASED HYDRAULIC FRACTURING FLUID FOR CARBON DIOXIDE SEQUESTRATION AND METHODS RELATED THERETO

(71) Applicant: Saudi Arabian Oil Company, Dhahran (SA)

(72) Inventors: Hasmukh A. Patel, Katy, TX (US); Ahmet Atilgan, Houston, TX (US); Katherine L. Hull, Houston, TX (US); Younane Abousleiman, Norman, OK (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/188,258

(22) Filed: Mar. 22, 2023

(65) Prior Publication Data

US 2024/0318070 A1  Sep. 26, 2024

(51) Int. Cl.
*C09K 8/66* (2006.01)
*C09K 8/76* (2006.01)

(52) U.S. Cl.
CPC .............. *C09K 8/665* (2013.01); *C09K 8/76* (2013.01); *C09K 2208/32* (2013.01)

(58) Field of Classification Search
CPC ...................................................... E21B 43/26
See application file for complete search history.

(56) References Cited

U.S. PATENT DOCUMENTS

2021/0198558 A1* 7/2021 Hull ..................... C09K 8/68

OTHER PUBLICATIONS

Mendonça et al. Evaluation of Produced Water Treatment Using Advanced Oxidation Processes and Sodium Ferrate(VI), 2017.*
Thompson, G. W., et al, J. Am. Chem. Soc. 1951, 73, 3, 1379-1381.
Sharma, V. K., Potassium ferrate(VI) : an environmentally friendly oxidant, Advances in Environmental Research 6 (2002), 143-156.
Hull, K. L. et al; Chemomechanical effects of oxidizer-CO2 systems upon hydraulically fractured unconventional source rock, 100, 6, 2022, 1417-1426.
Patel, H.A., et al; Carbon dioxide capture adsorbents: chemistry and methods, ChemSusChem 10 (7), 1303-1317.

* cited by examiner

*Primary Examiner* — William D Hutton, Jr.
*Assistant Examiner* — Avi T Skaist
(74) *Attorney, Agent, or Firm* — Vorys, Sater, Seymour and Pease LLP (57) ABSTRACT

Compositions, methods, and systems for treating a subterranean formation for carbon dioxide sequestration include introducing a ferrate(VI)-based hydraulic fracturing fluid into a subterranean formation. The ferrate(VI)-based hydraulic fracturing fluid comprises ferrate(VI) oxidizing agent having the formula $M_2FeO_4$, where M is an alkali metal or an alkaline earth metal, and an aqueous carrier fluid. Reacting the ferrate(VI) oxidizing agent with a surface of the subterranean formation increases a pore volume of pores therein and interacting the ferrate(VI) oxidizing agent with carbon dioxide ($CO_2$) sequesters the $CO_2$ with the ferrate (VI) oxidizing agent within the pores.

12 Claims, 7 Drawing Sheets

FERRATE(VI)-BASED HYDRAULIC FRACTURING FLUID FOR CARBON DIOXIDE SEQUESTRATION AND METHODS RELATED THERETO

FIELD OF THE DISCLOSURE

The present disclosure relates generally to oilfield production and, more particularly, to compositions, systems, and methods for carbon dioxide sequestration in a subterranean formation.

BACKGROUND OF THE DISCLOSURE

Carbon dioxide ($CO_2$) sequestration (e.g., of free $CO_2$) has recently been the subject of intense research and development activities in a number of fields, primarily due to its environmental impacts as a greenhouse gas. In this regard, significant pressure has been placed on various industries to decrease their $CO_2$ emissions in order to address the effects of global warming and ocean acidification. Indeed, the United Nations Climate Change Conference and the Paris Agreement have adopted efficient $CO_2$ reduction strategies to encompass $CO_2$ capture, utilization, and sequestration in a closed loop, with geological $CO_2$ sequestration being a critical initiative for permanent $CO_2$ storage.

Geological $CO_2$ sequestration effectiveness is dependent and limited by the particular type of geological formation, its depth horizon and reservoir extension, and its likelihood of $CO_2$ plume migration and leakage, among other geological and engineering long-term operational issues. Accumulated $CO_2$ volume within geological formations over time may suffer from plume migration and/or loss of cap rock seal capacity resulting in $CO_2$ leakage. Such migration and/or leakage may result in significant environmental, health, and societal effects. There is therefore a need for permanent sequestration with no liability of migration or leakage over many centuries.

A number of approaches have been implemented to capture $CO_2$ for transport and storage. For example, geological $CO_2$ storage in deep saline aquafers has also been identified as a viable means of $CO_2$ sequestration because they have substantial storage capacity (e.g., with up to 85% organic-rich formations), but leakage or plume migration of the $CO_2$ can enter water sources. $CO_2$ has also been used in depleted d hydrocarbon (fossil fuel) formation reservoirs during tertiary enhanced oil recovery (tEOR) operation, with the aim to permanently sequester at least a portion of the $CO_2$ therein, but have limited $CO_2$ storage capacity compared to saline aquafers. However, hydrocarbon formations may be more secure (e.g. from leakage and plume migration) compared to deep saline aquifers.

tEOR may involve "scrubbing" the walls of existing channels or fractures in a hydrocarbon geological formation with treatment fluids that, as of recently, may include one or more oxidizing agents. The inclusion of such oxidizing agents has demonstrated $CO_2$ sorption potential in addition to enhanced oil recovery. However, tEOR does not generally permanently alter the geology of the formation, such as by creating new or enhanced porosity in which $CO_2$ sorption may be enhanced.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a method is provided including introducing a ferrate(VI)-based hydraulic fracturing fluid into a subterranean formation, reacting the ferrate(VI) oxidizing agent with a surface of the subterranean formation so as to increase a pore volume of pores therein, and interacting the ferrate(VI) oxidizing agent with carbon dioxide ($CO_2$), so as to sequester the $CO_2$ with the ferrate(VI) oxidizing agent within the pores. The ferrate(VI)-based hydraulic fracturing fluid comprises ferrate(VI) oxidizing agent having the formula $M_2FeO_4$, where M is an alkali metal or an alkaline earth metal, and an aqueous carrier fluid.

In another embodiment consistent with the present disclosure, a ferrate(VI)-based hydraulic fracturing fluid is provided including a ferrate(VI) oxidizing agent having the formula $M_2FeO_4$, where M is an alkali metal or an alkaline earth metal, and an aqueous carrier fluid, the ferrate(VI)-based hydraulic fracturing fluid for use in reacting with a surface of a subterranean formation to increase a pore volume therein and interacting with carbon dioxide ($CO_2$), so as to sequester the $CO_2$ within the pores.

In another embodiment consistent with the present disclosure, system is provided including a pump fluidly coupled to a tubular, the tubular extending into a subterranean formation and containing a ferrate(VI)-based hydraulic fracturing fluid, wherein the ferrate(VI)-based hydraulic fracturing fluid comprises ferrate(VI) oxidizing agent having the formula $M_2FeO_4$, where M is an alkali metal or an alkaline earth metal, and an aqueous carrier fluid, the ferrate(VI)-based hydraulic fracturing fluid for use in reacting with a surface of a subterranean formation to increase a pore volume therein and interacting with carbon dioxide ($CO_2$), so as to sequester the $CO_2$ within the pores.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to oilfield production and, more particularly, to compositions, systems, and methods for $CO_2$ sequestration in an organic-rich subterranean formation using a hydraulic fracturing fluid comprising a ferrate(VI) oxidizing agent.

The current rate of $CO_2$ emission worldwide is almost 32 gigatons per year, and therefore a large portion of the emitted $CO_2$ must be stored and sequestered in available and proven geological formations for permanent sequestration with no liability of migration and/or leakage centuries. That is, $CO_2$ sequestration should result in permanent mineralization of the sequestered $CO_2$. Physical locations for geological sequestration of the vast amount of emitted $CO_2$ are limited.

Hydrocarbons located in geological formations require twice as much oxygen as carbon to form $CO_2$, increasing their mass and volume within the atmosphere considerably. As such, geological $CO_2$ sequestration may be most effective in an organic-rich source rock that can be treated and/or tailored to enhance or enlarge porosity (e.g., a permanent sink) and improve $CO_2$ sequestration capacity.

As provided in the present disclosure, it has been observed that ferrate(VI) can be used in hydraulic fracturing operations to create newly expanded porosity spaces and organic surfaces in organic-rich rock for enhanced $CO_2$ volume sequestration. Moreover, ferrate(VI) included in hydraulic fracturing operations can also provide enhanced oil and gas recovery.

Definitions

As used herein, the term "geological formation," and grammatical variants thereof, refers to a subterranean (underground) geological formation.

As used herein, the terms "$CO_2$ sequestration" or "$CO_2$ storage," and grammatical variants thereof, are used interchangeably and refer to the process of storing free $CO_2$ in a geological formation.

The term "organic-rich source rock" or "organic-rich geological formations," and grammatical variants thereof, are used interchangeably and refer to rocks rich in total organic matter in the range of about 1% organic matter by weight (wt. %) to about 60 wt. % organic matter, such as a lower limit of about 1 wt. %, 5 wt. %, 10 wt. %, 15 wt. %, 20 wt. %, and 25 wt. % to an upper limit of about 60 wt. %, 50 wt. %, 45 wt. %, 40 wt. %, 35 wt. %, 30 wt. %, and 25 wt. % of organic matter, encompassing any value and subset therebetween.

As used herein, "carbon dioxide" or "$CO_2$" includes gaseous forms, liquid forms, supercritical forms, and any combination thereof.

The term "proppant particulates" or simply "proppant" refers to solid particles used to prevent fractures from fully closing once hydraulic pressure is removed in a hydraulic fracturing operation. By keeping the fractures from fully closing, the proppant particulates form a proppant pack having interstitial spaces that act as conductive paths through which fluids produced from the formation may flow. As used herein, the term "proppant pack" refers to a collection of proppant particulates in a fracture, thereby forming a "propped fracture."

As used herein, the term "porosity," and grammatical variants thereof, refers to a percentage of pore volume or void space within a rock (e.g., subterranean formation) that can contain fluids. The term "fluids," as used herein, refers to gases, liquids, and solids, particularly $CO_2$ fluids, as defined herein.

Ferrate Fracturing Fluid, Methods, and Systems

Ferrate(VI) is a strong oxidizing agent having a high oxidation/reduction (redox) potential that has been previously used for the removal of organic contaminants in wastewater treatment plants. However, the use of ferrate(VI) to increase the porosity of organic-rich geological formations, and during hydraulic fracturing operations, has not heretofore been explored to enhance organic surface sorption for improved $CO_2$ sequestration. Indeed, as described herein, the use of ferrate(VI) for enhancing CO2 sequestration capacity in organic-rich geological formations is improved compared to traditional oxidizing agents. Table 1 demonstrates the redox potential (E°, electronvolts (eV)) for various traditional oxidizing agents, as well as ferrate(VI).

TABLE 1

| Oxidizing Agent | Redox Potential (E°, eV) |
| --- | --- |
| Chlorine | 1.36 |
| Hypochlorite | 1.48 |
| Chlorine Dioxide | 0.95 |
| Perchlorate | 1.38 |
| Ozone | 2.1 |
| Hydrogen Peroxide | 1.78 |
| Dissolved Oxygen | 1.23 |
| Permanganate | 1.68 |
| Bromate | 1.5 |
| Ferrate(VI) | 2.2 |

As shown, ferrate(VI) oxidizing agent exhibits the highest redox potential compared to the family of oxidizers. Ozone exhibits a lesser, but similar, redox potential, but is damaging to the environment and human health. Differently, ferrate (VI) is a non-toxic, environmentally friendly oxidizing agent, giving no mutagenic/carcinogenic by-products. It should be that the oxidizing agents listed in Table 1 may be used in combination with ferrate(VI) oxidizing agent (e.g., bromate, hypochlorite, and the like), without departing from the scope of the present disclosure.

The ferrate(VI) oxidizing agent for use in the hydraulic fracturing fluids of the present disclosure has the following Formula: $M_2FeO_4$, where M is potassium (K) or sodium (Na), or other alkali metal or an alkaline earth metal. Accordingly, the term "ferrate(VI)" as used herein includes both potassium ferrate and sodium ferrate, unless otherwise specified.

The reaction product of ferrate(VI) in an aqueous base fluid, upon decomposition, yields oxygen, alkali hydroxide and ferric hydroxide/oxyhydroxide, as depicted in Reaction 1.

Reaction 1

In addition to the generation of enhanced porosity in organic-rich formations for increased $CO_2$ sequestration volumetric space, the reaction between ferrate(VI) and organic-rich source rock generates $Fe(III)(OH)_3$. $Fe(III)(OH)_3$ reacts positively in reducing the creation of acidic gases, such as $H_2S$. $H_2S$ reacts to reduce Fe(III) to Fe(II), and the resultant $Fe(II)(OH)_2$ is available to react with $CO_2$, leading to mineral carbonization into iron carbonate or siderite ($FeCO_3$). The reaction is shown below as Reaction 2.

Reaction 2

Accordingly, the use of ferrate(VI) oxidizing agent during a fracturing operation, as described herein, acts to synergistically enhance porosity in organic-rich source rock and produce a positive reaction byproduct for permanent $CO_2$ sequestration.

With reference to FIGS. 1A-1D, illustrated is a schematic of a subterranean formation hydraulic fracturing system 100 treated with the ferrate(VI)-based hydraulic fracturing fluid of the present disclosure. FIGS. 1A-1D are shown as a progression and, as provided above, like elements in the various figures may be denoted by like reference numerals for consistency. The circular portions of each of FIGS. 1A-1D are zoomed-in views of the properties and/or reactions taking place as part of the hydraulic fracturing system 100, as described below.

Figures 1A, 1B:
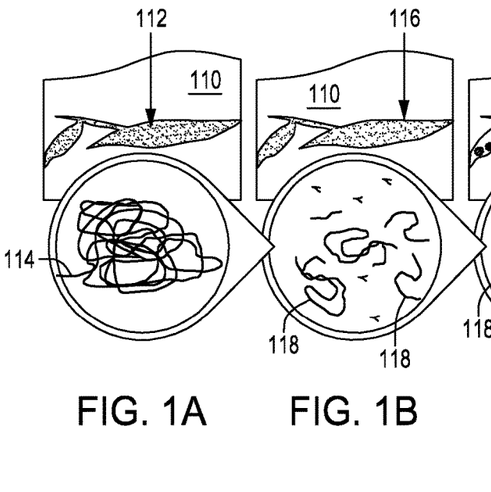
FIGS. 1A-1D illustrate a progressive schematic of a subterranean formation hydraulic fracturing system treated with the ferrate(VI)-based hydraulic fracturing fluid of the present disclosure.
Figures 1C, 1D:
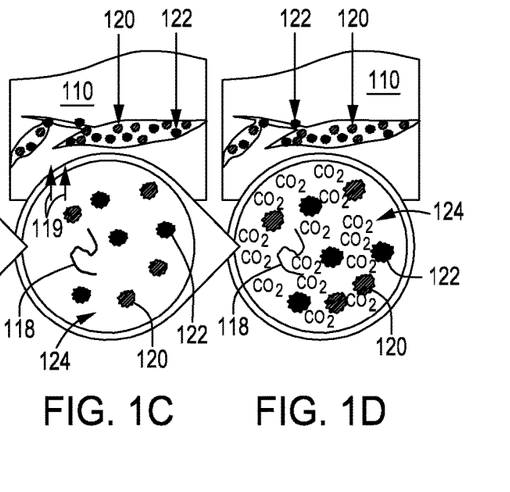

Each of FIGS. 1A-1D depict a subterranean formation 110. As shown in FIG. 1A, the subterranean formation 110 comprises organic-rich source rock 112, shown in zoom in the circular portion of FIG. 1A. The organic-rich source rock 112 comprises long-chain hydrocarbons with or without entrapped short chain hydrocarbons and gases 114. Referring now to FIG. 1B, upon hydraulic fracturing of the formation 110 with ferrate(VI)-based hydraulic fracturing fluid, the organic-rick source rock 112 (FIG. 1A) is oxidized into oxidized organic matter 116 by the ferrate(VI) oxidizing agent, shown in zoom in the circular portion of FIG. 1B. The oxidation of the organic matter 116 results in the creation of short-chained hydrocarbons ($C_nH_{4-n}$) 118. With reference now to FIG. 1C, at least a portion (e.g., a majority) of the short-chained hydrocarbons 118 (FIG. 1B) may be recovered to the surface 119. A portion of the short-chained hydrocarbons 118 may remain in the formation 110 (see zoomed portions of FIGS. 1C and 1D). Simultaneous with hydraulic fracturing and cleaving of organic matter (FIG. 1B), and as shown in FIG. 1C, the ferrate(VI) oxidizing agent in the ferrate(VI)-based hydraulic fracturing fluid reacts with organic matter 122 (after oxidation) to enhance porosity (pore volume 124) and spent oxidizing agent 120 forming byproducts, such as iron hydroxide/oxide, as described above. Referring now to FIG. 1D, $CO_2$ is pumped into the formation 110 for storage between in the pore volume 124. Upon reaction with CO2, the spent oxidizing agent 120 (iron hydroxide/oxide) is converted to iron carbonate (not labeled). It is to be noted that the size of organic matter 122 and spent oxidizing agent 120 will vary and are not necessarily uniform.

Accordingly, the present disclosure provides methods for introducing a ferrate(VI)-based hydraulic fracturing fluid into a subterranean formation comprising organic-rich source rock at a rate and pressure sufficient to create or enhance at least one fracture therein, reacting ferrate(VI) oxidizing agent with the organic-rich source rock to increase porosity of the organic-rich source rock, and introducing $CO_2$ to the organic-rich source rock to sequester the $CO_2$ therein. A reaction between spent ferrate(VI) and the CO2 may further result in mineral carbonation to iron carbonate. Hydrocarbons may be recovered as part of the hydraulic fracturing operation.

The ferrate(VI)-based hydraulic fracturing fluids of the present disclosure may be used to fracture and enhance porosity for $CO_2$ sequestration of organic-rich unconventional geological formations (e.g., shale, coal bed methane, tight gas) or organic-rich conventional geological formations (e.g., sandstone).

The ferrate(VI) oxidizing agent is aqueous soluble and, therefore, ferrate(VI)-based hydraulic fracturing fluids are comprised of an aqueous carrier fluid. The aqueous carrier fluid may include, but is not limited to, freshwater, acidified water, salt water, seawater, brine (e.g., a saturated salt solution), or an aqueous salt solution (e.g., a non-saturated salt solution), purified wastewater, and any combination thereof. In one or more instances, the aqueous carrier fluid is "slick water," having a low viscosity of generally less than about 100 centipoise (cP), such as in the range of about 1 cP to about 100 cP, or from a lower limit of 1 cP, 10 cP, 20 cP, 30 cP, 40 cP, and 50 cP to an upper limit of 100 cP, 90 cP, 80 cP, 70 cP, 60 cP, and 50 cP, encompassing any value and subset therebetween.

The ferrate(VI) oxidizing agent may be present in the ferrate(VI)-based hydraulic fracturing fluid in an amount sufficient to react with organic matter in an organic-rich source rock, which may depend accordingly on the particular type of organic-rich source rock, among other factors. In one or more embodiments, the concentration of ferrate(VI) oxidizing agent in the ferrate(VI)-based hydraulic fracturing fluid is in the range of about 0.1 millimolar (mM) to about mM of aqueous carrier fluid, such as from a lower limit of 0.1 mM, 1 mM, 10 mM, 20 mM, 30 mM, 40 mM, and 50 mM to an upper limit of 100 mM, 90 mM, 80 mM, 70 mM, 60 mM, and 50 mM, encompassing any value and subset therebetween.

In one or more instances the concentration of ferrate(VI) oxidizing agent in the ferrate(VI)-based hydraulic fracturing fluid may be based on the amount of organic matter in the subterranean formation into which the fracturing fluid is being introduced. In some embodiments, the amount of ferrate(VI) oxidizing agent introduced into a subterranean formation may be in a ratio of 0.1 gram (g) ferrate(VI) oxidizing agent to 1000 g of organic matter, such as a lower limit of 0.1 g to 500 g, or 10 g to 100 g, or 50 g to 100 g, or 100 g to 100 g of ferrate(VI) oxidizing agent to organic matter, encompassing any value and subset therebetween.

In some embodiments, the ferrate(VI)-based hydraulic fracturing fluid may comprise proppant particulates for creating proppant packs in produced fractures during hydraulic fracturing operations with the ferrate(VI)-based hydraulic fracturing fluid. Suitable materials for these proppant particulates may include, but are not limited to, sand, bauxite, gravel, ceramic material, glass material, polymeric material (e.g., ethylene-vinyl acetate or composite materials), polytetrafluoroethylene material, nut shell pieces, a cured resinous particulate comprising nut shell pieces, seed shell pieces, a cured resinous particulate comprising seed shell pieces, fruit pit pieces, a cured resinous particulate comprising fruit pit pieces, wood, composite particulates, and any combination thereof. Suitable composite particulates may comprise a binder and a filler material, wherein suitable filler materials may include, but are not limited to, silica, alumina, fumed carbon, carbon black, graphite, mica, titanium dioxide, barite, meta-silicate, calcium silicate, kaolin, talc, zirconia, boron, fly ash, hollow glass microspheres, solid glass, and the like, and any combination thereof.

In one or more embodiments, when included, the proppant particulates may be present in the ferrate(VI)-based hydraulic fracturing fluid in an amount in the range of about 0.5 pounds per gallon (ppg) to about 30 ppg by volume of the carrier fluid, such as about from a lower limit of about 0.5 ppg, 1 ppg, 5 ppg, 10 ppg, and 15 ppg to an upper limit of about 30 ppg, 25 ppg, 20 ppg, and 15 ppg, encompassing any value and subset therebetween.

The ferrate(VI)-based hydraulic fracturing fluid described herein may further comprise one or more optional additives including, but not limited to, a salt, a weighting agent, an inert solid, a fluid loss control agent, an emulsifier, a dispersion aid, a corrosion inhibitor, an emulsion thinner, an emulsion thickener, a viscosifying agent, a gelling agent, a surfactant, a particulate, a proppant, a gravel particulate, a lost circulation material, a foaming agent, a gas, a pH control additive, a breaker, a biocide, a bactericide, a crosslinker, a stabilizer, a chelating agent, a scale inhibitor, a gas hydrate inhibitor, an non-ferrate(VI) oxidizer, a reducer, a friction reducer, a clay stabilizing agent, and any combination thereof. Selected additive(s) should not interfere with the function of the ferrate(VI) oxidizing agent to enhance porosity for CO2 sequestration.

Accordingly, the present disclosure provides a ferrate (VI)-based hydraulic fracturing fluid comprising a ferrate (VI) oxidizing agent (e.g., potassium ferrate, sodium ferrate, or a combination thereof). The ferrate(VI)-based hydraulic fracturing fluid may additionally comprise proppant and/or one or more additives. The present disclosure further comprises ferrate(VI)-based hydraulic fracturing fluid may be used to fracture a subterranean formation comprising organic-rich source rock, recover hydrocarbons therefrom, react the ferrate(VI) oxidizing agent included in the ferrate (VI)-based hydraulic fracturing fluid with organic matter in the organic-rich source rock to expand (or create) pores therein and, thus, the porosity of the organic-rich source rock.

In some embodiments, the ferrate(VI)-based hydraulic fracturing fluids disclosed herein (including mixing of the ferrate(VI) oxidizing agent and carrier fluid, optional proppant, and/or optional additives) can be mixed at a remote location from a well site and shipped to the well site or, in other embodiments, the ferrate(VI)-based hydraulic fracturing fluids can mixed at the well site. In some embodiments, the ferrate(VI)-based hydraulic fracturing fluids may be mixed and pumped on-the-fly. A person having ordinary skill in the art of designing such fluids with the benefit of this disclosure will be able to consider these factors and determine whether remote mixing or on-site mixing is most appropriate for a given operation.

In various embodiments, systems configured for delivering the ferrate(VI)-based hydraulic fracturing fluids described herein to a downhole location are described. In various embodiments, the systems can comprise a pump fluidly coupled to a tubular, the tubular containing the treatment fluids described herein.

The pump may be a high pressure pump in some embodiments. As used herein, the term "high pressure pump" will refer to a pump that is capable of delivering a ferrate(VI)-based hydraulic fracturing fluid downhole at a pressure of about 1000 psi or greater. A high pressure pump may be used when it is desired to introduce the ferrate(VI)-based hydraulic fracturing fluids to a subterranean formation at or above a fracture gradient of the subterranean formation, but it may also be used in cases where fracturing is not desired. In some embodiments, the high pressure pump may be capable of fluidly conveying solid particulate matter, such as the proppant particulates or solid additives described in some embodiments herein, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the ferrate(VI)-based hydraulic fracturing fluids to the high pressure pump. In such embodiments, the low pressure pump may "step up" the pressure of the ferrate(VI)-based hydraulic fracturing fluids before reaching the high pressure pump.

In some embodiments, the systems described herein can further comprise a mixing tank that is upstream of the pump and in which the ferrate(VI)-based hydraulic fracturing fluids are formulated. In various embodiments, the pump (e.g., a low pressure pump, a high pressure pump, or a combination thereof) may convey the treatment fluids from the mixing tank or other source of the treatment fluids to the tubular. In other embodiments, however, the ferrate(VI)-based hydraulic fracturing fluids may be formulated offsite and transported to a worksite, in which case the ferrate(VI)-based hydraulic fracturing fluid may be introduced to the tubular via the pump directly from its shipping container (e.g., a truck, a railcar, a barge, or the like) or from a transport pipeline. In either case, the ferrate(VI)-based hydraulic fracturing fluids may be drawn into the pump, elevated to an appropriate pressure, and then introduced into the tubular for delivery downhole.

In one or more aspects, the ferrate(VI)-based hydraulic fluids are delivered to a subterranean formation having a temperature in the range of about 5° C. to about 250° C., such as from a lower limit of about 0.5° C., 1° C., 25° C., 50° C., 75° C., 100° C., and 125° C. to an upper limit of about 250° C., 225° C., 200° C., 175° C., 150° C., and 125° C., encompassing any value and subset therebetween. The ferrate(VI)-based hydraulic fracturing fluids may further be delivered to a subterranean formation at a pressure in the range of about 1 bar to about 800 bar, such as from a lower limit of about 1 bar, 50 bar, 100 bar, 150 bar, 200 bar, 250 bar, 300 bar, 350 bar, and 400 bar to an upper limit of about 800 bar, 750 bar, 700 bar, 650 bar, 600 bar, 550 bar, 500 bar, 450 bar, and 400 bar, encompassing any value and subset therebetween.

Further, upon delivery of the ferrate(VI)-based hydraulic fluids, $CO_2$ injection into the subterranean formation may be performed. Alternatively, $CO_2$ injection may be performed simultaneously with the delivery of the ferrate(VI)-based hydraulic fluids. In yet another alternative, delivery of the ferrate(VI)-based hydraulic fluids may be performed in cycles with $CO_2$ injection.

Figure 2:
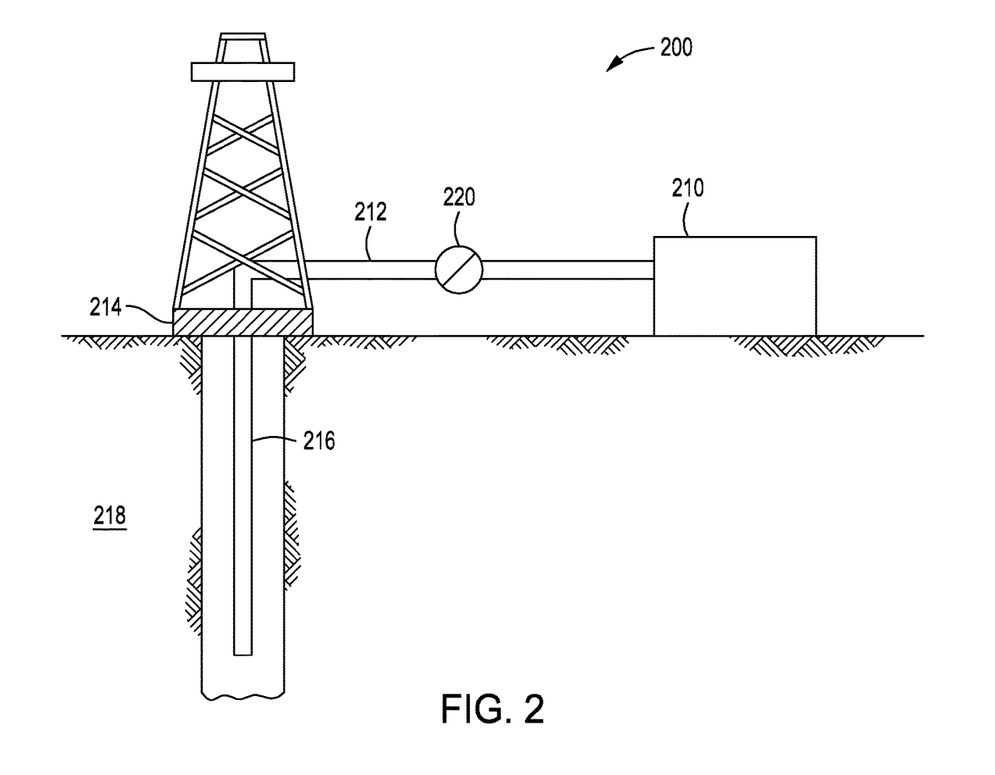
FIG. 2 shows an illustrative schematic of a system that can deliver the ferrate(VI)-based hydraulic fracturing fluids of the present disclosure to a subterranean (downhole) location.

FIG. 2 shows an illustrative schematic of a system that can deliver the ferrate(VI)-based hydraulic fracturing fluids of the present disclosure to a downhole location, according to one or more embodiments. It should be noted that while FIG. 2 generally depicts a land-based system, it is to be recognized that like systems may be operated in subsea locations as well. As depicted in FIG. 2, system 200 may include mixing tank 210, in which the ferrate(VI)-based hydraulic fracturing fluids of the embodiments herein may be formulated. The ferrate(VI)-based hydraulic fracturing fluids may be conveyed via line 212 to wellhead 214, where the ferrate(VI)-based hydraulic fracturing fluids enter tubular 216, tubular 216 extending from wellhead 214 into subterranean formation 218. Upon being ejected from tubular 216, the ferrate(VI)-based hydraulic fracturing fluids may subsequently penetrate into subterranean formation 218. Pump 220 may be configured to raise the pressure of the ferrate(VI)-based hydraulic fracturing fluids to a desired degree before introduction into tubular 216. It is to be recognized that system 200 is merely exemplary in nature and various additional components may be present that have not necessarily been depicted in FIG. 2 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 2, the ferrate(VI)-based hydraulic fracturing fluid or a portion thereof may, in some embodiments, flow back to wellhead 214 and exit subterranean formation 218. In some embodiments, the ferrate(VI)-based hydraulic fracturing fluid that has flowed back to wellhead 214 may subsequently be recovered and recirculated to subterranean formation 218, or otherwise treated for use in a subsequent subterranean operation or for use in another operation or industry.

It is also to be recognized that the disclosed ferrate(VI)-based hydraulic fracturing fluids may also directly or indirectly affect the various downhole equipment and tools that may come into contact with the ferrate(VI)-based hydraulic fracturing fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 2.

While various embodiments have been shown and described herein, modifications may be made by one skilled in the art without departing from the scope of the present disclosure. The embodiments described here are exemplary only, and are not intended to be limiting. Many variations, combinations, and modifications of the embodiments disclosed herein are possible and are within the scope of the disclosure. Accordingly, the scope of protection is not limited by the description set out above, but is defined by the claims which follow, that scope including all equivalents of the subject matter of the claims.

EXAMPLE EMBODIMENTS

Embodiments disclosed herein include:

Embodiment A: A method comprising: introducing a ferrate(VI)-based hydraulic fracturing fluid into a subterranean formation, wherein the ferrate(VI)-based hydraulic fracturing fluid comprises ferrate(VI) oxidizing agent having the formula $M_2FeO_4$, where M is an alkali metal or an alkaline earth metal, and an aqueous carrier fluid; reacting the ferrate(VI) oxidizing agent with a surface of the subterranean formation so as to increase a pore volume of pores therein; and interacting the ferrate(VI) oxidizing agent with carbon dioxide ($CO_2$), so as to sequester the $CO_2$ with the ferrate(VI) oxidizing agent within the pores.

Embodiment B: A ferrate(VI)-based hydraulic fracturing fluid comprising ferrate(VI) oxidizing agent having the formula $M_2FeO_4$, where M is an alkali metal or an alkaline earth metal, and an aqueous carrier fluid, the ferrate(VI)-based hydraulic fracturing fluid for use in reacting with a surface of a subterranean formation to increase a pore volume therein and interacting with carbon dioxide ($CO_2$), so as to sequester the $CO_2$ within the pores.

Embodiment C: A system comprising: a pump fluidly coupled to a tubular, the tubular extending into a subterranean formation and containing a ferrate(VI)-based hydraulic fracturing fluid, wherein the ferrate(VI)-based hydraulic fracturing fluid comprises ferrate(VI) oxidizing agent having the formula $M_2FeO_4$, where M is an alkali metal or an alkaline earth metal, and an aqueous carrier fluid, the ferrate(VI)-based hydraulic fracturing fluid for use in reacting with a surface of a subterranean formation to increase a pore volume therein and interacting with carbon dioxide ($CO_2$), so as to sequester the $CO_2$ within the pores.

Each of Embodiments A, B or C may have one or more of the following additional elements in any combination:

Element 1: wherein M is potassium or sodium.

Element 2: wherein the ferrate(VI) oxidizing agent is present in a concentration in the range of 0.1 mM to 100 mM of the aqueous carrier fluid.

Element 3: wherein the subterranean formation comprises an organic matter content in the range of 1% to 60% by weight.

Element 4: wherein the ferrate(VI) oxidizing agent is present in a concentration ratio of 1 gram of ferrate(VI) oxidizing agent to 100 grams of organic matter content.

Element 5: wherein the ferrate(VI)-based hydraulic fracturing fluid comprises an additional oxidizing agent selected from the group consisting of chlorine, hypochlorite, chlorine dioxide, perchlorate, ozone, hydrogen peroxide, dissolved oxygen, permanganate, bromate, and any combination thereof.

Element 6: wherein the ferrate(VI)-based hydraulic fracturing fluid further comprises an additive selected from the group consisting of a salt, a weighting agent, an inert solid, a fluid loss control agent, an emulsifier, a dispersion aid, a corrosion inhibitor, an emulsion thinner, an emulsion thickener, a viscosifying agent, a gelling agent, a surfactant, a particulate, a proppant, a gravel particulate, a lost circulation material, a foaming agent, a gas, a pH control additive, a breaker, a biocide, a bactericide, a crosslinker, a stabilizer, a chelating agent, a scale inhibitor, a gas hydrate inhibitor, an non-ferrate(VI) oxidizer, a reducer, a friction reducer, a clay stabilizing agent, and any combination thereof.

Element 7: wherein the aqueous carrier fluid is selected from the group consisting of freshwater, acidified water, salt water, seawater, brine, or an aqueous salt solution, purified wastewater, and any combination thereof.

Element 8: further comprising introducing the ferrate (VI)-based hydraulic fracturing fluid into the subterranean formation at a pressure to induce one or more fractures.

Element 9: further comprising introducing $CO_2$ into the subterranean formation simultaneously with the ferrate(VI)-based hydraulic fracturing fluid.

Element 10: further comprising alternating introduction of $CO_2$ into the subterranean formation with introducing the ferrate(VI)-based hydraulic fracturing fluid.

By way of non-limiting example, exemplary combinations applicable to Embodiment A include: any one, more than one, or all of Elements 1-8 and 9, without limitation; any one, more than one, or all of Elements 1-8 and 10, without limitation.

By way of non-limiting example, exemplary combinations applicable to Embodiment B include: any one, more than one, or all of Elements 1-7, without limitation.

By way of non-limiting example, exemplary combinations applicable to Embodiment C include: any one, more than one, or all of Elements 1-7, without limitation.

To facilitate a better understanding of the embodiments described herein, the following examples of various representative embodiments are given. In no way should the following examples be read to limit, or to define, the scope of the present disclosure.

EXAMPLES

Example 1

In this Example, the reaction of ferrate(VI) oxidizing agent with organic-rich source rock ("OM-Rock") (S1-S4) was evaluated against a control OM-Rock having no ferrate (VI) oxidizing reactant (C1) for $CO_2$ update. Four different concentrations of ferrate(VI) oxidizing agents were used to measure the concentration of $CO_2$ uptake capacity. The reaction conditions are provided in Table 2, in which OM-Rock (120 milligrams (mg)) was dispersed in 15 mL of four different concentrations (millimolar (mM)) of potassium ferrate ($K_2FeO_4$) solutions in a scintillation glass vial and heated at 90° C. for 2 hours. The solid product was separated through filtration or centrifuge and the obtained powder was dried to remove excess water from the samples.

TABLE 2

| Sample No. | $K_2FeO_4$ (mM) | OM-Rock (mg) | Temp. (° C.) | Time (Hours) |
|---|---|---|---|---|
| S1 | 4.54 | 120 | 90 | 2 |
| S2 | 9.09 | 120 | 90 | 2 |
| S3 | 18.18 | 120 | 90 | 2 |
| S4 | 27.27 | 120 | 90 | 2 |

Thermogravimetric analysis (TGA) was performed using an SDT 650 thermal analyzer (TA Instruments (New Castle, Delaware)) equipped with gas lines ($N_2$ and $CO_2$). Samples C1 and S1-S4 in the amount of 50-60 mg (variation due to the testing equipment, with minimal or no influence on results) were loaded in a pan and activated at 120° C. for 20 minutes (min) under $N_2$ flow at 100 milliliters per min (mL/min). The temperature was thereafter reduced to 40° C. and dry $CO_2$ gas was flowed over the samples for 60 min at 100 mL/min. The amount of $CO_2$ that was sorbed by the samples was measured. The results are shown in FIG. 3.

Figure 3:
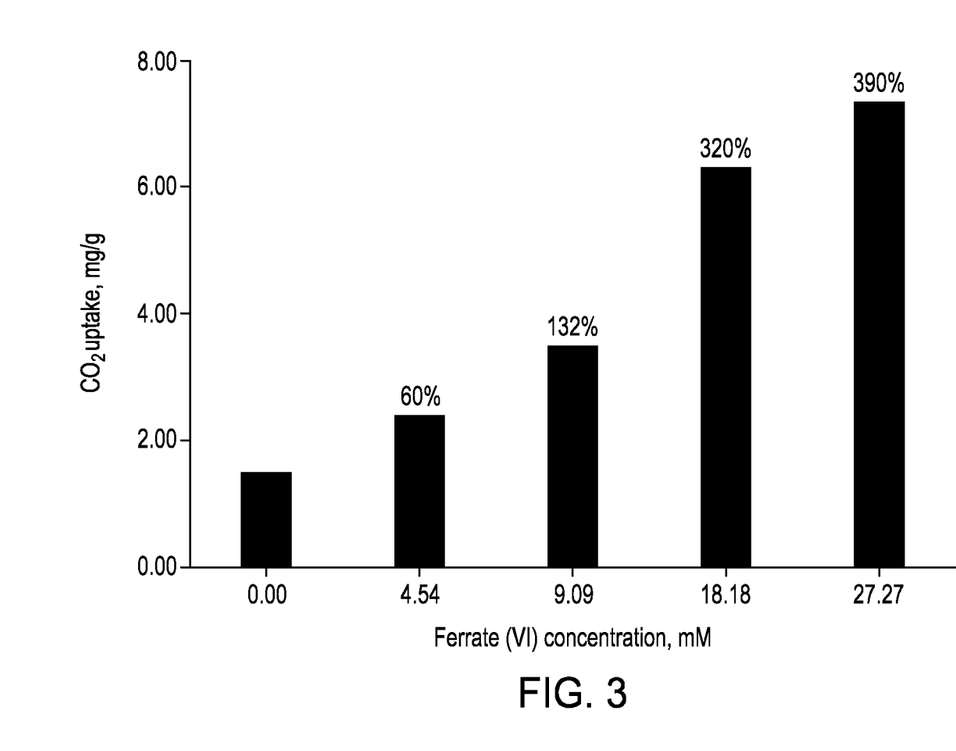
FIG. 3 is a chart showing the $CO_2$ uptake capacity of the ferrate(VI)-based hydraulic fracturing fluids of the present disclosure at 40° C.

As shown in FIG. 3, $CO_2$ uptake capacity of each of S1-S4 (reacted with ferrate(VI)) is greater than C1 (unreacted) at 40° C. Moreover, the $CO_2$ uptake capacity increased with increasing ferrate(VI) concentration (i.e., compared to C1, S1 showed an increase in uptake of $CO_2$ of 60%, S2 of 132%, S3 of 320%, and S4 of 390%). Notably, the oxidative reaction of OM-Rock and ferrate(VI) results in the generation of iron(III)hydroxide as a byproduct in addition to cleaving of organic matter, as described above.

Example 2

In this Example, various surface qualities, as well as $CO_2$ adsorption, of the reaction of ferrate(VI) oxidizing agent with OM-Rock (S5) was evaluated against a control OM-Rock having no ferrate(VI) oxidizing reactant (C1, identical to Example 1) for $CO_2$ update. In this Example, sample S6 was prepared by dispersing OM-Rock (120 mg) in 15 mL of a 10.1 mM concentration of a $K_2Fe_4$ solution in a scintillation glass vial, and heated at 90° C. for 2 hours. The solid product was separated through filtration or centrifuge and the obtained powder was dried to remove excess water from the samples.

Figure 4A:
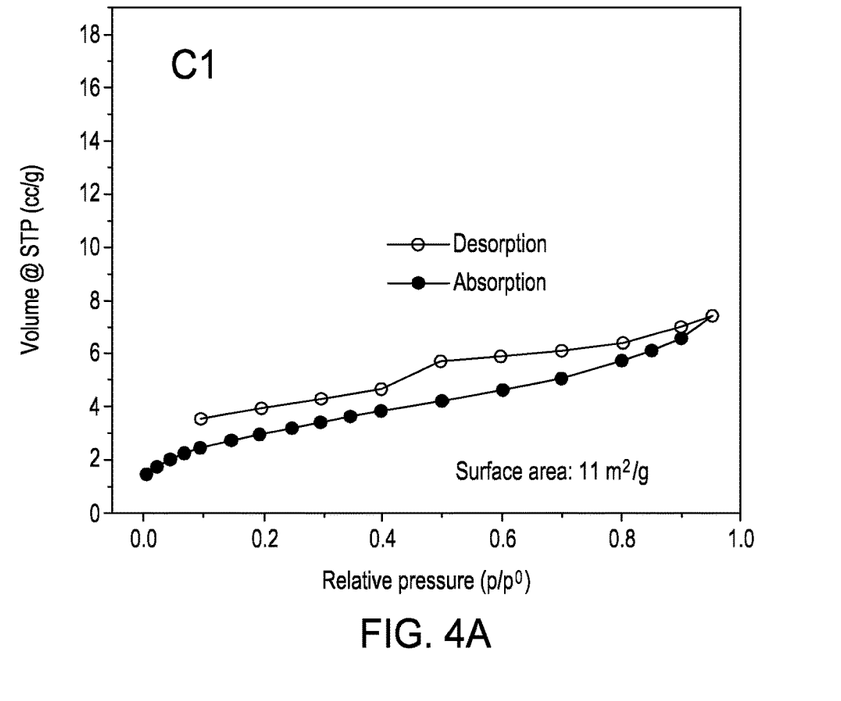
FIGS. 4A and 4B are charts showing the pore size and distribution of source rock treated with ferrate(VI)-based hydraulic fracturing fluids of the present disclosure.
Figure 4B:
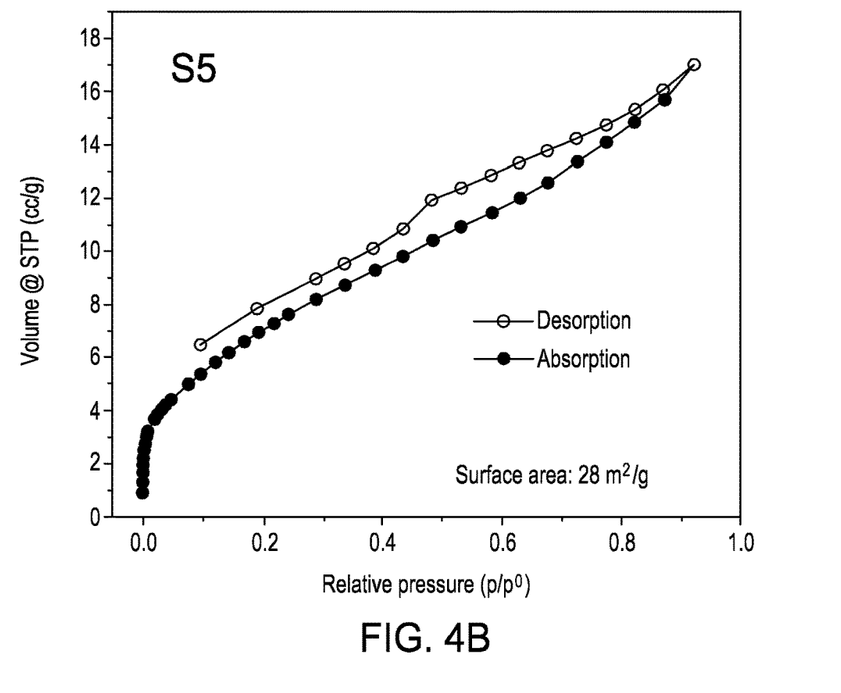

Surface Area Measurement:

OM-Rock having no ferrate(VI) oxidizing reactant (C1, identical to Example 1) and OM-Rock reacted with ferrate (VI) (S5) were subjected to $N_2$ adsorption-desorption measurement at 77 K to determine the changes in the surface area and pore size distribution. $N_2$ isotherms were collected using Autosorb iQ (high vacuum physisorption/chemisorption analyzer, Anton Paar) which is capable of measuring changes in the specific surface area below 0.01 m²/g. Referring to FIGS. 4A and 4B, the $N_2$ adsorption-desorption isotherms reveal that S5 shows higher adsorption volume of $N_2$ after oxidation of OM-Rock. The Brunauer-Emmett-Teller (BET) surface area calculated from the $N_2$ isotherms for both samples is shown in FIGS. 4A and 4B. Samples C1 and S5 show surface areas of 11 m²/g and 28 m²/g, respectively, which is about a 250% increase upon reaction with ferrate(VI). The increase in the surface area demonstrates the effect of ferrate(VI) oxidation on enhancing the surface area of the organic matter; that is, the overall connected porosity increases in the source rocks. The hysteresis in both isotherms suggests that the pore width is in the mesoporous range. However, sample S5 shows higher $N_2$ adsorption at low pressure which confirms that the oxidation reaction is creating new multi, sub-microns size of connected porosity.

Pore Size Distribution

Figure 5A:
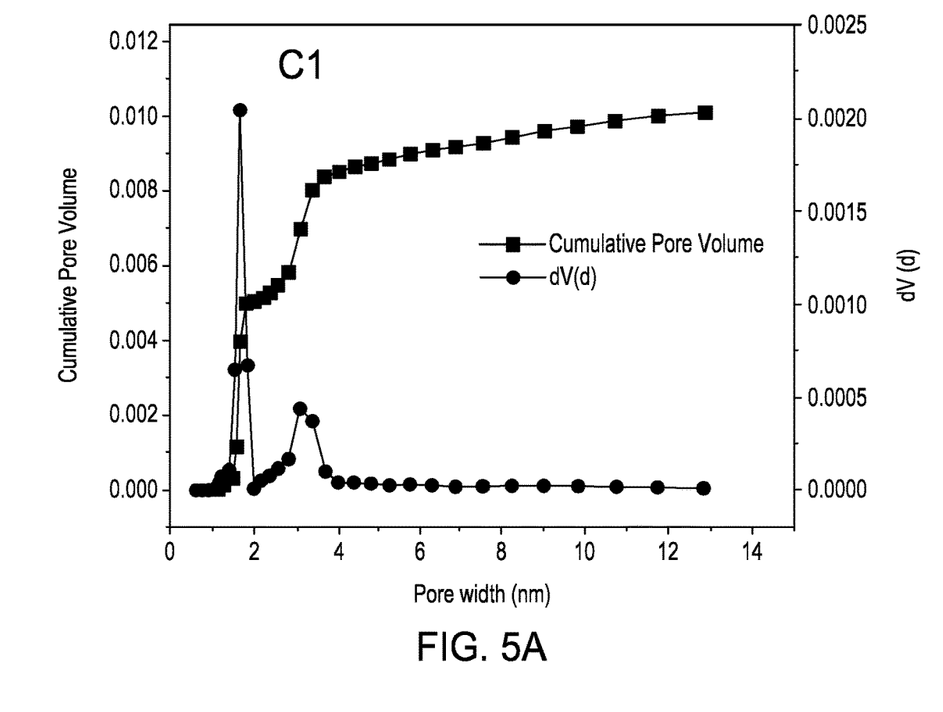
FIGS. 5A and 5B are charts showing cumulative pore volume and pore size of source rock treated ferrate(VI) (sample S5) compared to a control source rock.
Figure 5B:
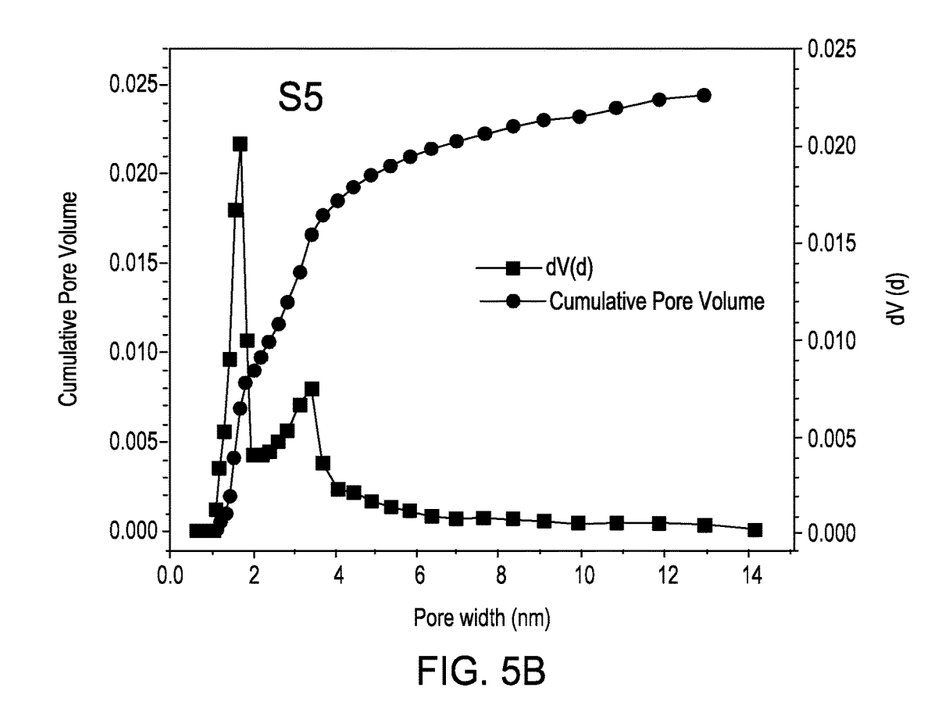

Referring now to FIGS. 5A and 5B, the oxidation of OM-Rock reacted with ferrate(VI) (sample S5) demonstrates enhanced pore size and distribution while increasing the surface area and the bulk source rock pore volume. The data collected from the $N_2$ isotherms at 77 K (FIGS. 4A, 4B) was used to calculate the various pore size distribution and the bulk pore volume for C1 and S5, as shown in FIGS. 5A and 5B. Quenched Solid Density Functional Theory (QSDFT) equilibrium model (slit pores) was employed to determine pore volume and pore size distribution. The pore volume for C1 and S5 was 0.011 cm³/g and 0.024 cm³/g, respectively, showing an almost double pore volume upon the oxidative reactions.

Example 3

Figure 6:
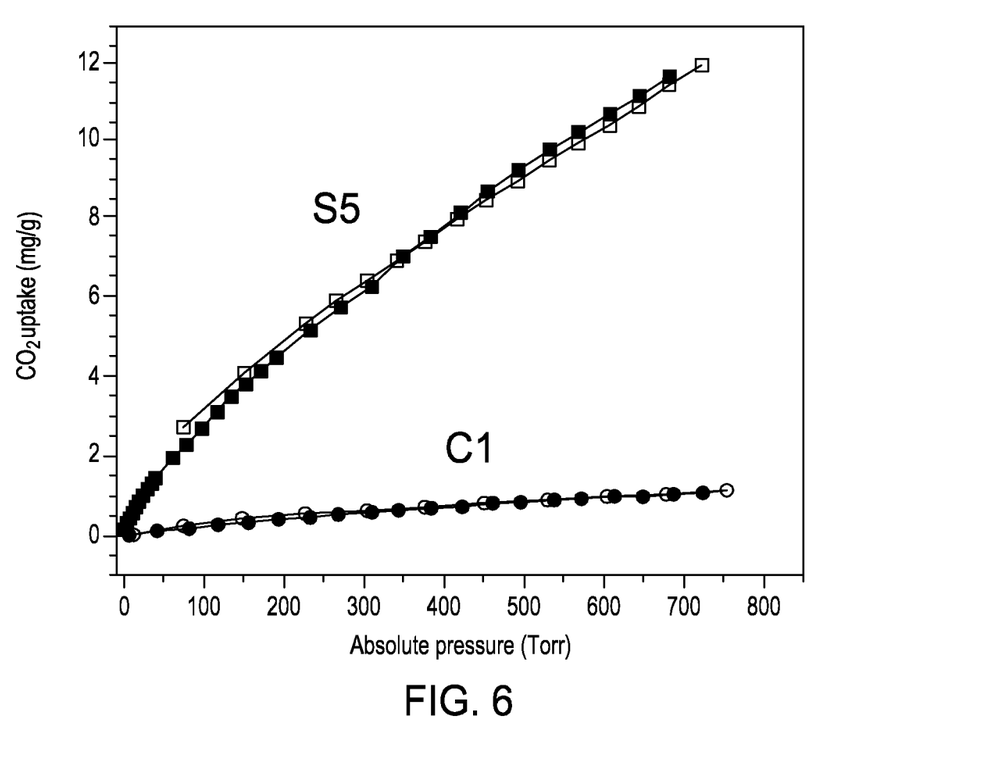
FIG. 6 is a chart showing the adsorption-desorption capacity of the ferrate(VI)-based hydraulic fracturing fluids of the present disclosure to determine changes in the surface area and pore size distribution.

In this Example, the effect of ferrate(VI) on the $CO_2$ adsorption-desorption characteristics was evaluated through the isothermal gas sorption analysis at 273 K and 1 bar. $CO_2$ isotherms were collected using Autosorb iQ (high vacuum physisorption/chemisorption analyzer, Anton Paar). As shown in FIG. 6, the $CO_2$ adsorption capacity of OM-Rock (C1) was found to be 1.06 mg/g. The improvement in the $CO_2$ adsorption capacity was observed after the OM-Rock was reacted with ferrate(VI) (S5), measuring 11.87 mg/g. Without being bound by theory, it is believed that a higher $CO_2$ capacity in $CO_2$ adsorption-desorption measurement compared to the $CO_2$-TGA measurement (Example 1) is due to degassing of samples carried out under ultra-high vacuum.

Example 4

Figure 7A:
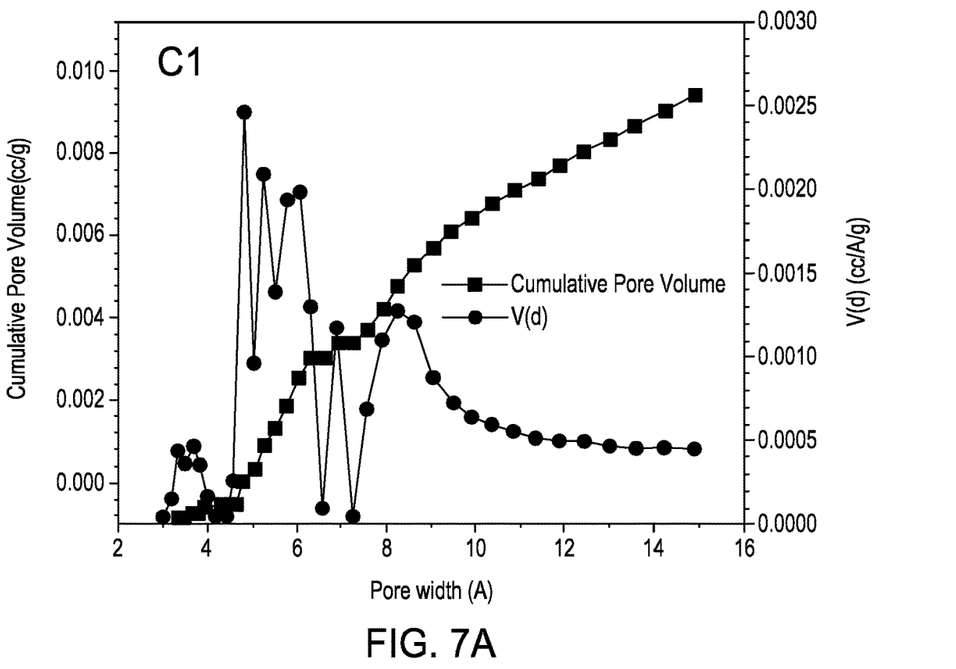
FIGS. 7A and 7B are charts showing pore size distribution and pore volume of the ferrate(VI)-based hydraulic fracturing fluids of the present disclosure.
Figure 7B:
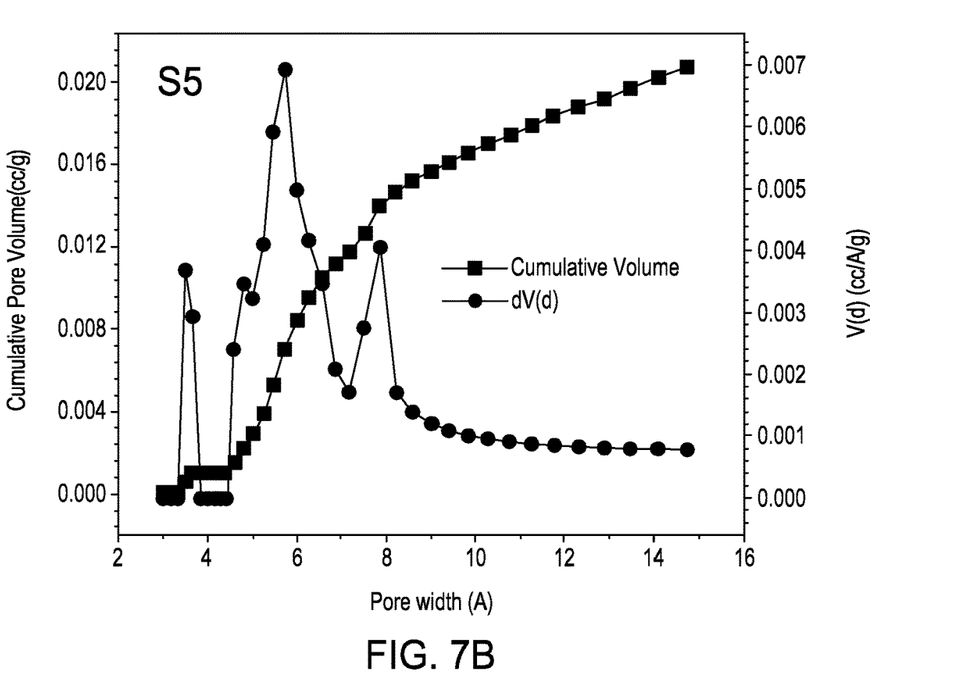

The pore size distribution and pore volume of OM-Rock (C1) and OM-Rock reacted with ferrate(VI) (S5) were calculated from the $CO_2$ adsorption isotherms, as shown in FIGS. 7A and 7B. The pore volume ($CO_2$) was 0.008 cm³/g and 0.021 cm³/g for OM-Rock (C1) and OM-Rock reacted with ferrate(VI) (S5), respectively. The surface area ($CO_2$) was 23.2 m²/g and 61.5 m²/g for OM-Rock (C1) and OM-Rock reacted with ferrate(VI) (S5), respectively. As shown, the pore volume was increased by 262% and the surface area was improved by 265% upon reaction with ferrate(VI) (S5).

Example 5

Figure 8:
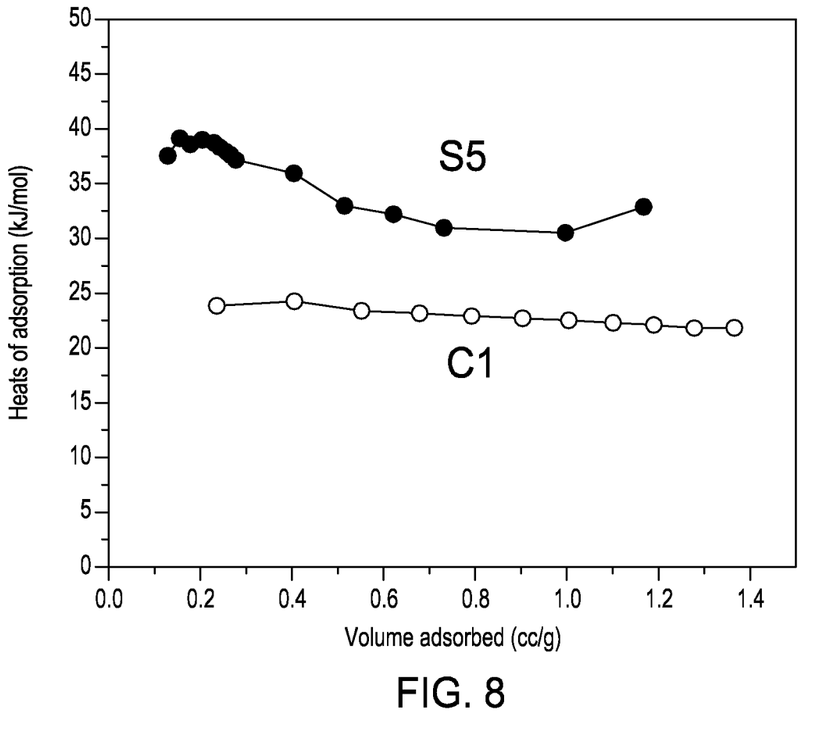
FIG. 8 is a chart showing $CO_2$ adsorption-desorption of the ferrate(VI)-based hydraulic fracturing fluids of the present disclosure at various temperatures.

In this example, the heat of adsorption was measured of OM-Rock (C1) and OM-Rock reacted with ferrate(VI) (S5) at 273K, which provides information about the $CO_2$ binding affinity with the source rock matrix. The higher the heat of adsorption, the better the $CO_2$ binding on the substrate (rock formation). The $CO_2$ adsorption-desorption isotherms measured at three different temperatures of 265K, 273K, and 298K to calculate the heat of $CO_2$ adsorption. The results are shown in FIG. 8. OM-Rock (C1) demonstrated a heat of adsorption in range of 24.4-22 kJ/mol, whereas OM-Rock reacted with ferrate(VI) (S5) demonstrated a much higher heat of adsorption in the range of 39.2-30.6 kJ/mol, showing the effect of ferrate(VI) on improving the $CO_2$-philic sites in OM-Rock.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A method comprising:
introducing a ferrate(VI)-based hydraulic fracturing fluid into a subterranean formation,
wherein the ferrate(VI)-based hydraulic fracturing fluid comprises ferrate(VI) oxidizing agent having the formula $M_2FeO_4$, where M is an alkali metal, and an aqueous carrier fluid;
reacting the ferrate(VI) oxidizing agent with a surface of the subterranean formation so as to increase a pore volume of pores therein; and interacting the ferrate(VI) oxidizing agent with carbon dioxide ($CO_2$), so as to sequester the $CO_2$ with the ferrate(VI) oxidizing agent within the pores.

2. The method of claim 1, wherein M is potassium.

3. The method of claim 1, wherein M is sodium.

4. The method of claim 1, wherein the ferrate(VI) oxidizing agent is present in a concentration in the range of 0.1 mM to 100 mM of the aqueous carrier fluid.

5. The method of claim 1, wherein the subterranean formation comprises an organic matter content in the range of 1% to 60% by weight.

6. The method of claim 5, wherein the ferrate(VI) oxidizing agent is present in a concentration ratio of 1 gram of ferrate(VI) oxidizing agent to 100 grams of organic matter.

7. The method of claim 1, wherein the ferrate(VI)-based hydraulic fracturing fluid comprises an additional oxidizing agent selected from the group consisting of chlorine, hypochlorite, chlorine dioxide, perchlorate, ozone, hydrogen peroxide, dissolved oxygen, permanganate, bromate, and any combination thereof.

8. The method of claim 1, wherein the ferrate(VI)-based hydraulic fracturing fluid further comprises an additive selected from the group consisting of a salt, a weighting agent, an inert solid, a fluid loss control agent, an emulsifier, a dispersion aid, a corrosion inhibitor, an emulsion thinner, an emulsion thickener, a viscosifying agent, a gelling agent, a surfactant, a particulate, a proppant, a gravel particulate, a lost circulation material, a foaming agent, a gas, a pH control additive, a breaker, a biocide, a bactericide, a crosslinker, a stabilizer, a chelating agent, a scale inhibitor, a gas hydrate inhibitor, a non-ferrate(VI) oxidizer, a reducer, a friction reducer, a clay stabilizing agent, and any combination thereof.

9. The method of claim 1, wherein the aqueous carrier fluid is selected from the group consisting of freshwater, acidified water, salt water, seawater, brine, an aqueous salt solution, purified wastewater, and any combination thereof.

10. The method of claim 1, further comprising introducing the ferrate(VI)-based hydraulic fracturing fluid into the subterranean formation at a pressure to induce one or more fractures.

11. The method of claim 1, further comprising introducing $CO_2$ into the subterranean formation simultaneously with the ferrate(VI)-based hydraulic fracturing fluid.

12. The method of claim 1, further comprising alternating introduction of $CO_2$ into the subterranean formation with introducing the ferrate(VI)-based hydraulic fracturing fluid.

* * * * *